(12) United States Patent
Saperstein et al.

(10) Patent No.: US 7,416,123 B2
(45) Date of Patent: Aug. 26, 2008

(54) SYSTEM AND APPARATUS FOR LOCATING LOST ITEMS

(75) Inventors: Jan R. Saperstein, 2008 Winsted Way, Marietta, GA (US) 30062; Richard A. Willis, Arlington, TN (US)

(73) Assignee: Jan R. Saperstein, Marietta, GA (US)

( * ) Notice: Subject to any disclaimer, the term of this patent is extended or adjusted under 35 U.S.C. 154(b) by 298 days.

(21) Appl. No.: 11/303,791

(22) Filed: Dec. 16, 2005

(65) Prior Publication Data

US 2007/0138272 A1 Jun. 21, 2007

(51) Int. Cl.
*G06K 7/00* (2006.01)

(52) U.S. Cl. .................. 235/435; 235/384; 235/385; 235/439

(58) Field of Classification Search .................. 235/435, 235/384, 385, 439, 440, 446, 474, 492
See application file for complete search history.

(56) References Cited

U.S. PATENT DOCUMENTS

| | | | |
|---|---|---|---|
| 4,827,395 A | 5/1989 | Anders et al. | |
| 5,576,692 A | 11/1996 | Tompkins et al. | |
| 6,027,027 A | 2/2000 | Smithgall | |
| 6,097,703 A | 8/2000 | Larsen et al. | |
| 6,206,282 B1 | 3/2001 | Hayes, Sr. et al. | |
| 6,222,452 B1 | 4/2001 | Ahlstrom et al. | |
| 6,342,836 B2 | 1/2002 | Zimmerman | |
| 6,476,718 B1 | 11/2002 | Cartwright et al. | |
| 6,836,472 B2 | 12/2004 | O'Toole et al. | |
| 6,847,892 B2 | 1/2005 | Zhou et al. | |
| 6,965,568 B1 | 11/2005 | Larsen | |
| 2002/0014955 A1 | 2/2002 | Klitsgaard | |
| 2002/0040928 A1 | 4/2002 | Jalili et al. | |
| 2002/0081970 A1 | 6/2002 | Wingren | |
| 2003/0093187 A1 | 5/2003 | Walker | |
| 2003/0189094 A1* | 10/2003 | Trabitz | 235/385 |
| 2004/0201457 A1 | 10/2004 | O'Toole et al. | |
| 2005/0005482 A1 | 1/2005 | Arajou et al. | |
| 2006/0015503 A1 | 1/2006 | Simons et al. | |
| 2006/0080819 A1* | 4/2006 | McAllister | 29/403.3 |
| 2006/0109084 A1* | 5/2006 | Yarvis | 340/10.1 |

* cited by examiner

*Primary Examiner*—Seung H Lee
(74) *Attorney, Agent, or Firm*—Bryan W. Bockhop

(57) ABSTRACT

An apparatus for locating an item at a node includes an item-specific location device disposed in association with the item and that includes a circuit that uniquely identifies the item. A fixed mesh network communication device, in communication with a computer, is in an item storage portion of the node. The computer is programmed to execute the following steps: if an item identification request is received from a requester via a global computer network including a requested item identification, then send an item identification message to the fixed mesh network communication device. If an item identified message is received from the fixed mesh network communication device indicating that the item-specific location device corresponds to the requested item identification, then transmit to the requester, via the global computer network, an item identified notification and a location identification that identifies the node.

12 Claims, 4 Drawing Sheets

SYSTEM AND APPARATUS FOR LOCATING LOST ITEMS

BACKGROUND OF THE INVENTION

1. Field of the Invention

The present invention relates to locating systems and, more specifically, to a system of locating an item with a mesh network communications device.

2. Description of the Prior Art

With increases in global travel and trade, misdirection of transported items causes substantial hardship to those who are transporting such items and substantial cost to those responsible for the transport of such items. When an item cannot be found, insurance providers also bear a cost. For example, airlines misdirect many pieces of luggage each year. Finding lost luggage causes considerable inconvenience to the passengers whose luggage is lost and considerable expense to the airline that misdirected the luggage.

One method of preventing misdirection of luggage includes attaching a bar-coded tag to each piece of luggage as the owner checks in for a flight. The tag is scanned at the point of departure and at the point of arrival (and any intermediate points) and the location of the luggage is stored in a computer database. While such a tracking system has been quite effective in reducing the incidence of lost luggage, luggage still gets misdirected. This can occur for one of several reasons, including airline ticketing counter attendant error resulting in an incorrect tag being applied to a piece of luggage. Also, a tag can be inadvertently removed from a piece of luggage during the handling process.

This problem is also significant in other areas. For example, international freight transport typically involves sending containers on container ships. The containers often include exterior bar-coded labels used for tracking purposes. However, containers can be misdirected through operator error. When a container is misdirected, the cost of failing to locate it quickly can be substantial.

Certain existing and proposed location systems include devices that apply a radio transponder, such as an RFID tag, to the item being transported. When an item is lost, a message is sent to each transportation node where the item could be sent and an operator with a corresponding radio frequency device searches through the node seeking a return signal indicating the presence of the lost item. Such systems have the disadvantage of requiring a considerable amount of time to be spent by personnel at each node, including all of the nodes to which the item was not spent.

Therefore, there is a need for a system that determines, with minimal operator involvement, which node an item has been sent to.

SUMMARY OF THE INVENTION

The disadvantages of the prior art are overcome by the present invention which, in one aspect, is an apparatus for locating an item at a node that includes an item-specific location device disposed in association with the item and that includes a circuit that uniquely identifies the item. At lease one fixed mesh network communication device is disposed in an item storage portion of the node. A computer is in communication with the fixed mesh network communication device and is in communication with a global computer network. The computer is programmed to execute the following steps: if an item identification request is received from a requester via the global computer network that includes a requested item identification, then send an item identification message to the fixed mesh network communication device; and if an item identified message is received from the fixed mesh network communication device in response to the item identification message indicating that the item-specific location device corresponds to the requested item identification, then transmit to the requester, via the global computer network, an item identified notification and a location identification that identifies the node.

In another aspect, the invention is a luggage locating apparatus for locating a piece of luggage at a transportation node. A luggage-specific location device is disposed within the piece of luggage and includes a circuit that uniquely identifies the piece of luggage. At lease one fixed mesh network communication device is disposed in a luggage storage portion of the transportation node. A computer is in communication with the fixed mesh network communication device and is in communication with a global computer network. The computer is programmed to execute the following steps: if a luggage identification request is received from a requester via the global computer network that includes a requested luggage identification, then send a luggage identification message to the fixed mesh network communication device; and if a luggage identified message is received from the fixed mesh network communication device in response to the luggage identification message indicating that the luggage-specific location device corresponds to the requested luggage identification, then transmit to the requester, via the global computer network, a luggage identified notification and a location identification that identifies the node.

In another aspect, the invention is a luggage-specific location device that includes a power source, a mesh network communication device, a memory circuit and a processor. The mesh network communication device is electrically coupled to the power source. The memory circuit stores a unique luggage-specific identification. The processor is electrically coupled to the power source and is in communication with the memory circuit and the mesh network communication device. The processor is programmed to execute the following steps: if a luggage identification message is received from the fixed mesh network communication device, then compare the unique luggage identification to the unique luggage-specific identification; and if the unique luggage identification corresponds to the unique luggage-specific identification, then transmit the luggage identified message to the fixed mesh network communication device.

In yet another aspect, the invention is a method for locating a piece of luggage having a luggage-specific location device associated therewith. The method employs a computer in communication with a fixed mesh network communication device located at a transportation node and a global computer network. In the method, a computer receives a luggage identification request from a requester via the global computer network. A luggage identification message is sent to the fixed mesh network communication device in response to the luggage identification request. A luggage identified notification and a location identification that identifies the transportation node in response to a luggage identified message received from the fixed mesh network communication device is transmitted to the requester via the global computer network. The luggage identified notification and a location identification indicating that the luggage-specific location device corresponds to the requested luggage identification.

These and other aspects of the invention will become apparent from the following description of the preferred embodiments taken in conjunction with the following drawings. As would be obvious to one skilled in the art, many variations and modifications of the invention may be effected without departing from the spirit and scope of the novel concepts of the disclosure.

DETAILED DESCRIPTION OF THE INVENTION

Figure 1:
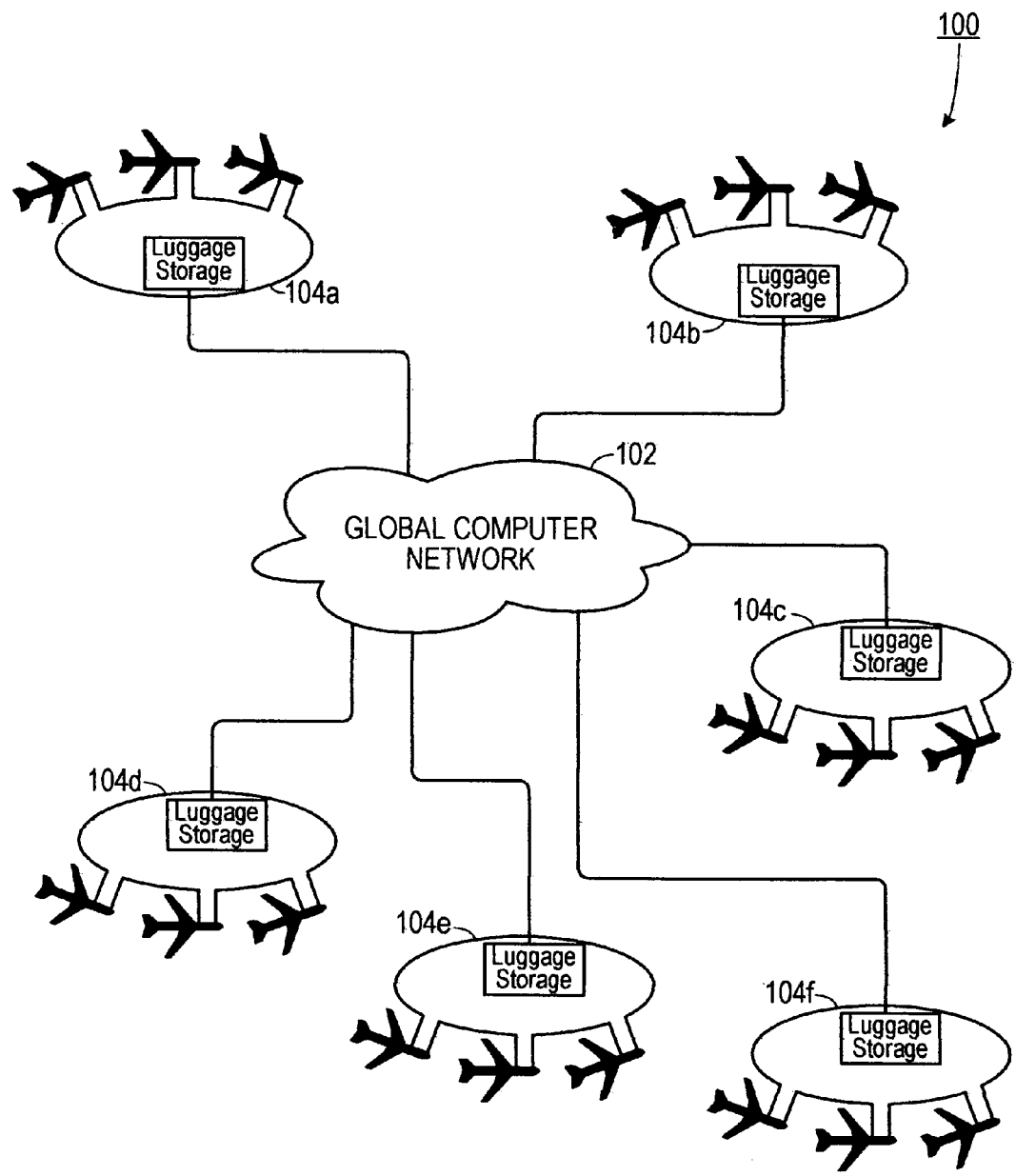
FIG. 1 is a schematic diagram of a system according to one illustrative embodiment of the invention.

A preferred embodiment of the invention is now described in detail. Referring to the drawings, like numbers indicate like parts throughout the views. As used in the description herein and throughout the claims, the following terms take the meanings explicitly associated herein, unless the context clearly dictates otherwise: the meaning of "a," "an," and "the" includes plural reference, the meaning of "in" includes "in" and "on." Also, as used herein, "global computer network" includes the Internet.

As shown in FIG. 1, one illustrative embodiment of the invention is a system 100 for locating lost items, such as luggage. In the system 100, a plurality of different transportation nodes 104a-f (such as airports, train stations, shipping terminals, etc.) communicate with each other via a global computer network 102. In one illustrative embodiment of the invention employed in aviation, when a traveler arrives at an airport (e.g., airport 104d) and notices that a piece of luggage is missing, he can go to a lost luggage representative for the airline on which he traveled to report the missing luggage. The lost luggage representative sends a message to all of the other airports in the system 100 identifying the lost piece of luggage. A search for the lost piece of luggage is performed at each airport using the system described below. If the piece of lost luggage is found at an airport (e.g., airport 104b) then a signal is sent from a computer at the airport 104b to the destination airport 104d indicating that the piece of luggage has been found and identifying the airport at which it has been found.

Figure 2A:
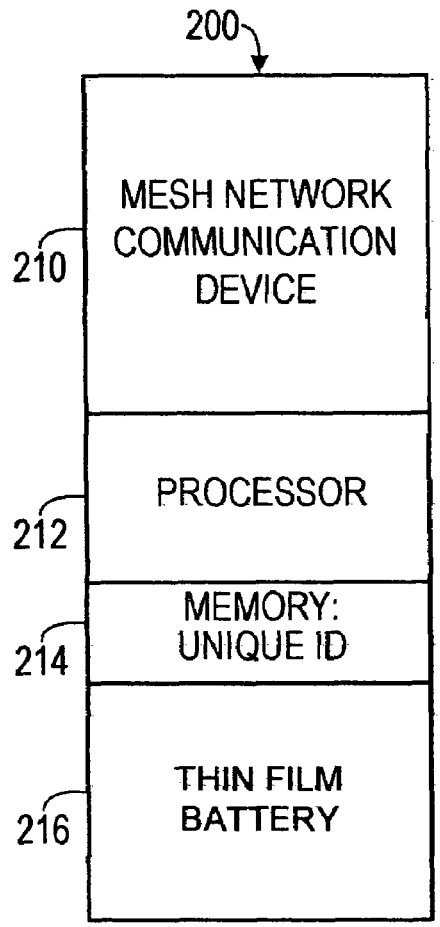
FIG. 2A is a block diagram of one embodiment of a mesh network location device.

A device 200 used in identifying luggage is shown in FIG. 2A. Each piece of luggage that employs the system would include one of these devices 200 disposed therein. The device 200 includes a mesh network communication device 210 that is powered by a power source 216. A processor 212 is also powered by the power source 216 and is in data communication with a memory 214 and the mesh network communication device 210. The processor 212 could be a standard onboard microprocessor or microcontroller. The memory stores, inter alia, a unique identification. The unique identification could take the form of a sequence of bits that uniquely identify a specific device 200 with respect to all other similar devices in the system.

The power source 216 could include a battery (such as the thin film battery shown) or another type of power source, such as a micro fuel cell, a super capacitors, etc. One source of suitable thin-film batteries is Excellatron Solid State LLC, 263 Decatur Street, Atlanta, Ga. 30312.

In one exemplary embodiment, any one of several commercially-available ZigBee® devices may be used for the mesh network communication device 210. ZigBee® is a published specification set of high level communication protocols designed to use small, low power digital radios based on the IEEE 802.15.4 standard for wireless personal area networks. In one embodiment, the device 210 employs the 802.14.5-IEEE MAC Layer as the radio specification for communications and uses the ZigBee® protocol (firmware stack) to govern the utilization of the radio. In one example, the device 210 operates in the 2.4 GHz band but could also have the capability to operate in 868 MHz as well as the 900 MHz bands. Typically, 868 MHZ has been designated for European operations, whereas 900 MHz has been authorized for operation in North America Currently, 2.4 GHz is accepted world-wide as an acceptable frequency. In one illustrative mode, the device 210 will communicate in a STAR and Peer-to-Peer network topology. Such networks, sometimes referred to as "mesh networks" or "ad-hoc networks" are self-discovering, self-forming and self-healing.

Figure 2B:
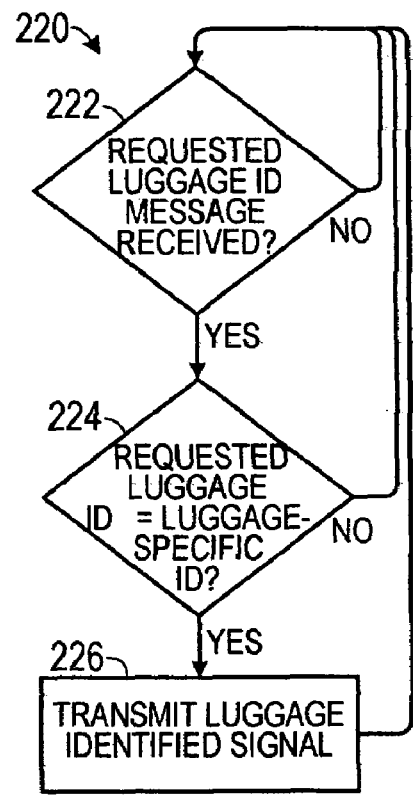
FIG. 2B is a flow diagram of one representative method that may be employed in the mesh network location device shown in FIG. 2A

The processor 212 is programmed to execute several steps, as shown in the flow chart 220 shown in FIG. 2B. Initially, the system waits until an item identification message is received 222 from the fixed mesh network communication device. Then the processor 212 compares 224 the unique item identification to the unique item-specific identification. If the unique item identification corresponds to the unique item-specific identification, then the system transmits 226 the item identified message via the mesh network communication device 210.

Figure 3:
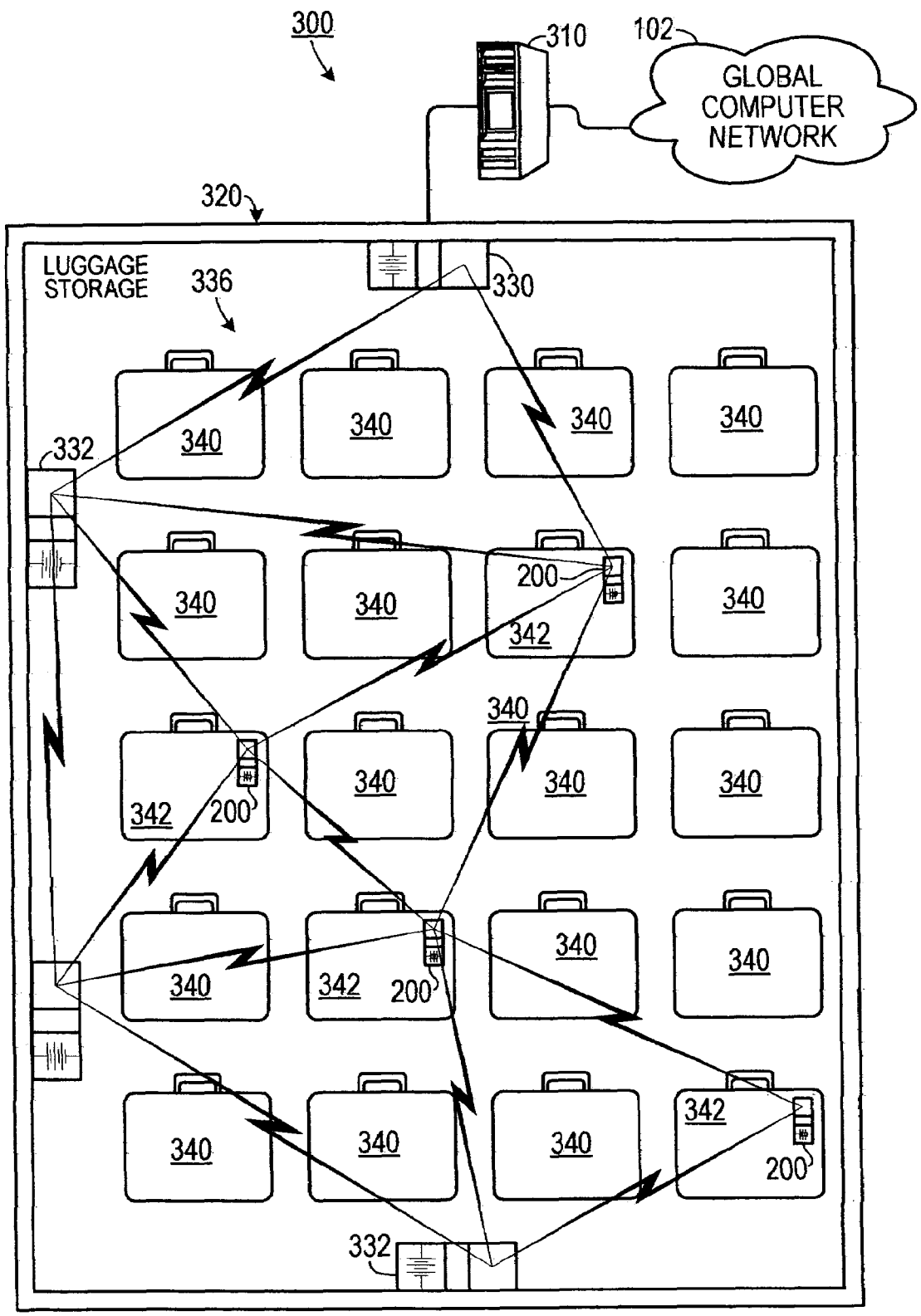
FIG. 3 is a schematic diagram of one embodiment of the invention being employed in a luggage storage room.

Typically, as shown in FIG. 3, lost luggage is stored in a luggage storage area 320 at an airport. A system 300 used to find lost luggage, according to one illustrative embodiment of the invention, could include a computer 310 in communication with the global computer network 102 and a fixed mesh network communications device 330 that is disposed in the luggage storage area 320. Several other fixed mesh network communications devices 332 may also be located in the luggage storage area 320, to serve as passive relays. While some pieces of luggage 340 may not participate in the luggage location system, pieces of luggage 342 that do would have item-specific location device 200 disposed therein.

Each of the fixed mesh network communications devices 330 and 332 and the item-specific location devices 200 are able to communicate with each other and can form an ad-hoc mesh network 336 when they are within range of each other. When the computer receives an item identification message from the global computer network 102, it transmits an item identification message to fixed mesh network communications device 330. The item identification message will include a unique identification of a piece of luggage that has been lost and that is sought by the requester. The fixed mesh network communications device 330 then transmits an item identification message (including the unique identification of the piece of lost luggage being sought) to the item-specific location devices 200 and fixed mesh network communications devices 332 within range. Each item-specific location device 200 and fixed mesh network communications device 332 retransmits the item identification message to surrounding item-specific location devices 200 and fixed mesh network communications devices 332. Also, each of the item-specific location devices 200 compares the identification of the piece of lost luggage being sought to the unique identification stored in its memory. If one of the item-specific location devices 200 has stored therein the identification of the piece of lost luggage being sought, it sends a luggage identified message to the computer via the mesh network 336. The computer 310 then sends to the requester via the global computer network 102 a message indicating that the piece of luggage has been found and an indication of which airport it has been found at.

Once it is determined that the piece of lost luggage is in a specific luggage storage area 320 at an airport, the specific location of the piece of luggage within the luggage storage area 320 may then be determined by one of several methods. In one simple method, an operator can move throughout the luggage storage area 320 looking for a piece of luggage that matches the description of the lost piece of luggage. Also, a hand-held mesh network communications device can be moved throughout the luggage storage area 320 continually sending out queries for the lost piece of luggage. If the hand-held device is equipped with a signal strength indicator, then the operator would move through luggage storage area 320 until a maximum received signal strength is detected.

Figure 4:
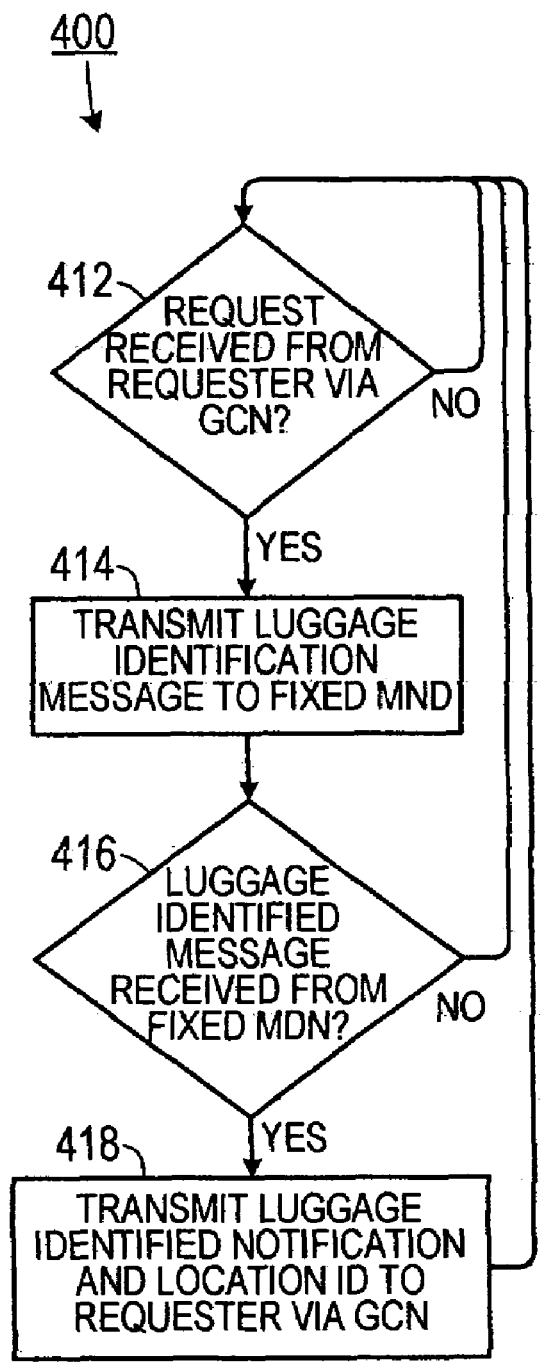
FIG. 4 is a flow diagram of a method that may be employed in a computer at a node.

As shown in FIG. 4, in one illustrative embodiment, the computer 310 may be programmed to determine 421 if a luggage identification request has been received from a requester via the global computer network (GCN). Once a luggage identification request has been received, then the computer sends 414a luggage identification message to the fixed mesh network communication device (Fixed MND). If a luggage identified message is received 416 from the fixed mesh network communication device in response to the luggage identification message indicating that the luggage-specific location device corresponds to the requested luggage identification, then the computer transmits 418 to the requester, via the global computer network, a luggage identified notification and a location identification that identifies the transportation node.

While the disclosed embodiment discusses use of the invention in a system for locating lost luggage at airports (or other types of transportation nodes, such as train stations, bus stations, etc.) the invention could be used in many other applications. For example, the invention could be used for locating lost shipping containers. It could also be used as part of a supply chain management system to track lost orders and even for performing inventory functions. For example, a company could perform remote inventories of its warehouses using the invention. The invention could also be used in vehicle fleet management systems, allowing a fleet manager to inventory the location of each of its vehicles remotely. As can be seen, given that some mesh network devices are relatively inexpensive, the invention can be used in many applications and it is intended that the claims below apply to all such applications.

The above described embodiments, while including the preferred embodiment and the best mode of the invention known to the inventor at the time of filing, are given as illustrative examples only. It will be readily appreciated that many deviations may be made from the specific embodiments disclosed in this specification without departing from the spirit and scope of the invention. Accordingly, the scope of the invention is to be determined by the claims below rather than being limited to the specifically described embodiments above.

What is claimed is:

1. An apparatus for locating an item at a node, comprising:
   a. an item-specific location device disposed in association with the item and that includes a circuit that uniquely identifies the item;
   b. at lease one fixed mesh network communication device disposed in an item storage portion of the node; and
   c. a computer, in communication with the fixed mesh network communication device and in communication with a global computer network, the computer programmed to execute the following steps:
      i. if an item identification request is received from a requester via the global computer network that includes a requested item identification, then send an item identification message to the fixed mesh network communication device; and
      ii. if an item identified message is received from the fixed mesh network communication device in response to the item identification message indicating that the item-specific location device corresponds to the requested item identification, then transmit to the requester, via the global computer network, an item identified notification and a location identification that identifies the node.

2. The apparatus of claim 1, wherein the item comprises a piece of luggage and wherein the item-specific location device is disposed within the piece of luggage.

3. The apparatus of claim 2, wherein the power source comprises a thin-film battery.

4. The apparatus of claim 2, wherein the power source comprises a fuel cell.

5. The apparatus of claim 1, wherein the node comprises a transportation node.

6. The apparatus of claim 1, wherein the item-specific location device comprises:
   a. a power source;
   b. a mesh network communication device electrically coupled to the power source;
   c. a memory circuit that stores a unique item-specific identification; and
   d. a processor, electrically coupled to the power source, in communication with the memory circuit and the mesh network communication device, the processor programmed to execute the following steps:
      i. if an item identification message is received from the fixed mesh network communication device, then compare the unique item identification to the unique item-specific identification; and
      ii. if the unique item identification corresponds to the unique item-specific identification, then transmit the item identified message to the fixed mesh network communication device.

7. A luggage locating apparatus for locating a piece of luggage at a transportation node, comprising:
   a. a luggage-specific location device, disposed within the piece of luggage, that includes a circuit that uniquely identifies the piece of luggage;
   b. at lease one fixed mesh network communication device disposed in a luggage storage portion of the transportation node; and
   c. a computer, in communication with the fixed mesh network communication device and in communication with a global computer network, the computer programmed to execute the following steps:
      i. if a luggage identification request is received from a requester via the global computer network that includes a requested luggage identification, then send a luggage identification message to the fixed mesh network communication device; and
      ii. if a luggage identified message is received from the fixed mesh network communication device in response to the luggage identification message indicating that the luggage-specific location device corresponds to the requested luggage identification, then transmit to the requester, via the global computer network, a luggage identified notification and a location identification that identifies the node.

8. The luggage locating apparatus of claim 7, wherein the luggage-specific location device comprises:
   a. a thin-film battery;
   b. a mesh network communication device electrically coupled to the thin-film battery;
   c. a memory circuit that stores a unique luggage-specific identification; and
   d. a processor, electrically coupled to the thin-film battery, in communication with the memory circuit and the mesh network communication device, the processor programmed to execute the following steps:
      i. if a luggage identification message is received from the fixed mesh network communication device, then compare the unique luggage identification to the unique luggage-specific identification; and
      ii. if the unique luggage identification corresponds to the unique luggage-specific identification, then transmit the luggage identified message to the fixed mesh network communication device.

9. A luggage-specific location device, comprising:
   a. a power source;
   b. a mesh network communication device electrically coupled to the power source;
   c. a memory circuit that stores a unique luggage-specific identification; and
   d. a processor, electrically coupled to the power source, in communication with the memory circuit and the mesh network communication device, the processor programmed to execute the following steps:
      i. if a luggage identification message is received from a fixed mesh network communication device, then compare the unique luggage identification to the unique luggage-specific identification; and
      ii. if the unique luggage identification corresponds to the unique luggage-specific identification, then transmit the luggage identified message to the fixed mesh network communication device.

10. The luggage-specific location device of claim 9, wherein the power source comprises a thin-film battery.

11. A transportation node luggage locating device for finding a luggage-specific location device disposed in the piece of luggage that includes a circuit that uniquely identifies the piece of luggage, comprising:
   a. at lease one fixed mesh network communication device disposed in a luggage storage portion of the transportation node; and
   b. a computer, in communication with the fixed mesh network communication device and in communication with a global computer network, the computer programmed to execute the following steps:
      i. if a luggage identification request is received from a requester via the global computer network that includes a requested luggage identification, then send a luggage identification message to the fixed mesh network communication device; and
      ii. if a luggage identified message is received from the fixed mesh network communication device in response to the luggage identification message indicating that the luggage-specific location device corresponds to the requested luggage identification, then transmit to the requester, via the global computer network, a luggage identified notification and a location identification that identifies the transportation node.

12. A method for locating a piece of luggage having a luggage-specific location device associated therewith, the method employing a computer in communication with a fixed mesh network communication device located at a transportation node and a global computer network; the method comprising the steps of:
   a. receiving, via the computer, a luggage identification request from a requester via the global computer network;
   b. sending a luggage identification message to the fixed mesh network communication device in response to the luggage identification request; and
   c. transmitting to the requester, via the global computer network, a luggage identified notification and a location identification that identifies the transportation node in response to a luggage identified message received from the fixed mesh network communication device, indicating that the luggage-specific location device corresponds to the requested luggage identification.

* * * * *